United States Patent [19]

Goupy

[11] 4,422,680

[45] Dec. 27, 1983

[54] ENERGY ABSORBING CURVED SECTIONS

[75] Inventor: Marcel Goupy, Saint Cloud, France

[73] Assignee: Regie Nationale des Usines Renault, Boulogne-Billancourt, France

[21] Appl. No.: 270,015

[22] Filed: Jun. 3, 1981

[30] Foreign Application Priority Data

Jun. 3, 1980 [FR] France .................. 80 12270

[51] Int. Cl.³ ........................... B60R 19/02
[52] U.S. Cl. ................... 293/122; 264/137; 293/1; 293/126; 293/154
[58] Field of Search ........... 293/120, 121, 122, 126, 293/154, 155; 264/137

[56] References Cited

U.S. PATENT DOCUMENTS

| 4,022,505 | 5/1977 | Saczawa | 293/120 |
| 4,050,689 | 9/1977 | Barton et al. | 293/122 |
| 4,090,728 | 5/1978 | Riedel | 293/122 |
| 4,208,069 | 6/1980 | Huber et al. | 293/120 |
| 4,296,060 | 10/1981 | Killmeyer | 264/137 |
| 4,305,770 | 12/1981 | Stiles | 264/137 |
| 4,318,762 | 3/1982 | Meyer | 264/137 |
| 4,361,352 | 11/1982 | Wakamatsu | 293/120 |

FOREIGN PATENT DOCUMENTS

| 2256656 | 12/1973 | France . |
| 2258987 | 8/1975 | France .................. 293/120 |
| 2,266,595 | 10/1975 | France .................. 293/120 |

*Primary Examiner*—Richard A. Bertsch
*Attorney, Agent, or Firm*—Oblon,Fisher,Spivak,McClelland & Maier

[57] ABSTRACT

Disclosed is an energy absorbing bumper formed of curved sections manufactured by pultrusion. The sections have perpendicular borders whose raised edges are connected by closure plates in areas of high stress. The face of the section can be formed with ripples so as to insure that reinforcing wires remain in areas subjected to high stresses.

9 Claims, 20 Drawing Figures

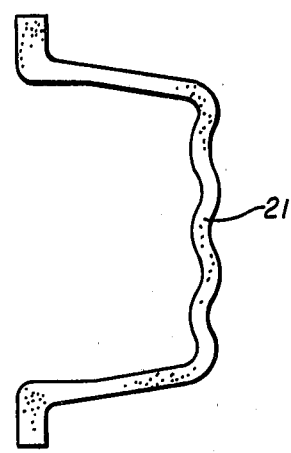
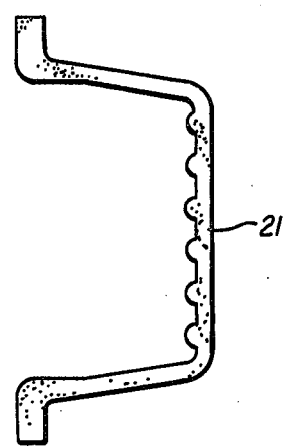
FIG. 7  FIG. 8
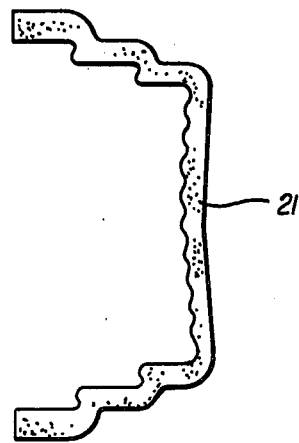
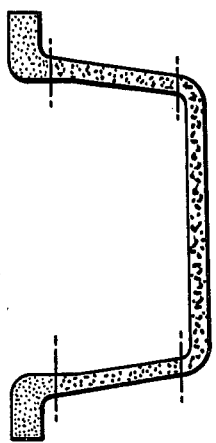
FIG. 9  FIG. 10

ENERGY ABSORBING CURVED SECTIONS

BACKGROUND OF THE INVENTION

1. Field of the Invention

The present invention relates to the utilization of curved sections manufactured by pultrusion, constituting energy absorbers of a reinforced plastic material having unidirectional reinforcements, in particular for making bumpers or reinforcements for automobile bodies.

In his French patent application No. 73/46.906, the applicant described the basic processes and devices making it possible to obtain bumpers by curved pultrusion, the bumpers being reinforced in certain areas which will undergo intense stresses.

SUMMARY OF THE INVENTION

The object of the present invention is to provide certain forms of products obtained from the preceding pultrusion technology.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 7 to 10 are sectional views of four structural possibilities for a section;

DETAILED DESCRIPTION OF THE PREFERRED EMBODIMENTS

Figure 1:
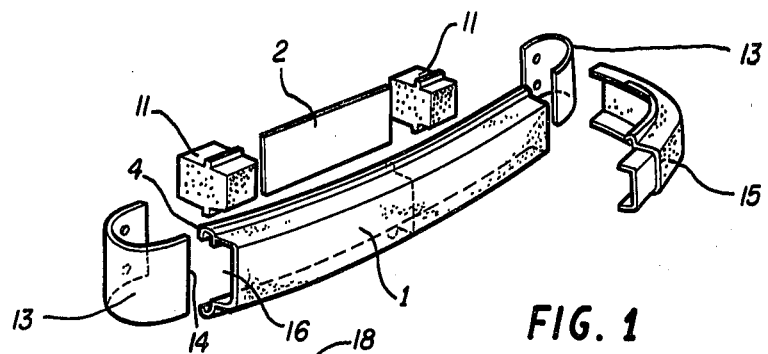
FIG. 1 is an exploded perspective view of an energy absorbing unit.

Considering the energy absorber for automobiles in FIG. 1, it can be seen to include a curved section 1 obtained by pultrusion, for example according to the processes and devices previously described in the applicant's patent application mentioned above. In substance, the following method is followed:

Glass threads or strands, as well as a ribbon, woven or not, are drawn through a vat containing, for example, a synthetic thermohardening resin of the polyester type, having a heat-activated catalyst. The threads, strands, resin etc. are then guided between shaping devices predetermining the shape of the resulting section, with a reticulation reaction being initiated at the core heated by means of a high-frequency dielectric loss device. The section then passes into an appropriately shaped drawing plate in which, while still ductile, it takes on its final shape and curvature, its path following a curved line having a constant radius.

The product is drawn out of the preceding device by clamps which move angularly to a station for cutting the product to desired lengths.

The sections 1 are preferably composed primarily of continuous parallel wires oriented in the direction of the pultrusion in the areas subject primarily to traction stresses, strands having continuous wires and looped wires in the areas subject primarily to shearing stresses and wire mat cut into continuous filaments having continuous parallel wires oriented in the direction of the pultrusion in the areas subject primarily to compression stresses. Various types of reinforcement fibers having different moduli could be utilized, these fibers being arranged at distances from the neutral fibers and being inversely proportional to their maximum elongation characteristics.

Figure 3:
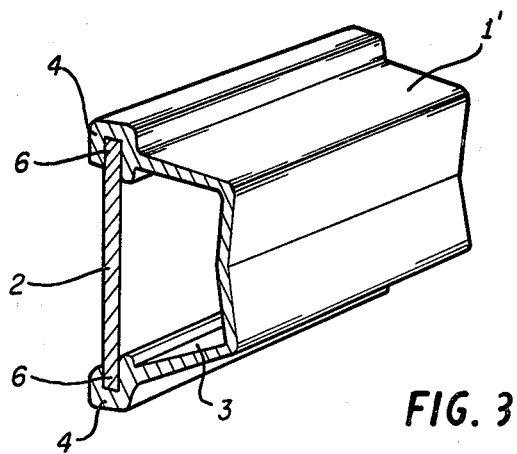
FIGS. 3 to 6 are perspective details of several variants of assembly of the basic elements.
Figure 4:
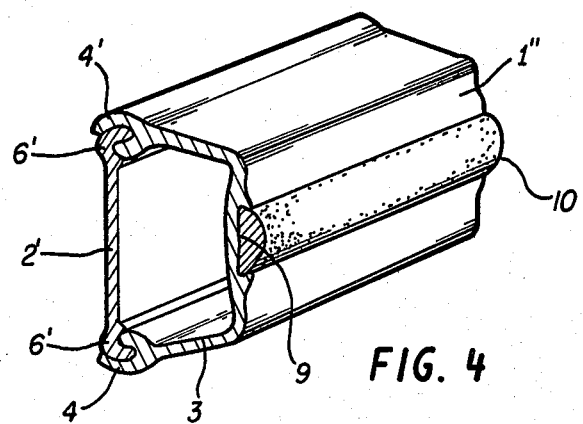
Figure 5:
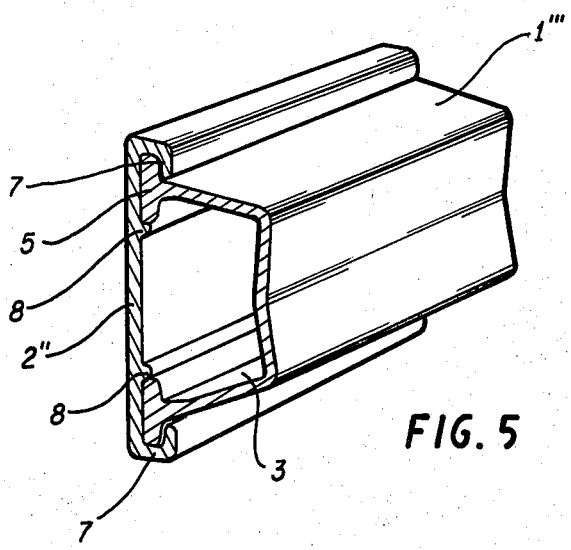

One of the characteristics of the preceding section 1 lies in the fact that it may be associated, at least locally in the maximum bending moment areas, when subjected to stress, with a closure plate such as 2 or 2' or 2", thus defining closed sections 3 such as those illustrated in FIGS. 3 to 5 which confer better resistance to deformation upon the resulting unit. It can be seen that in order to do this the section 1, which includes a frontal face 21 and upper and lower borders 22 ending in raised edges 4, 4' or 5, cooperates with the edges 6 and 6', or 7 and 8, of the closure plate, respectively. Such an arrangement prevents the section 1 from opening or closing at the time of an impact, the force of which being within specified limits.

Mounting is effected by mutual sliding of the closure plate along the raised edges of the section until they are properly situated. The final relative position of the section and plate can be consolidated or fixed by any known means, in particular by gluing.

In the variant of FIG. 4, it can be seen that it is possible to form a dovetail frontal seating 9 in the section 1", open towards the outside, into which is introduced a pad 10 of elastomer or a thermoplastic material.

Figure 6:
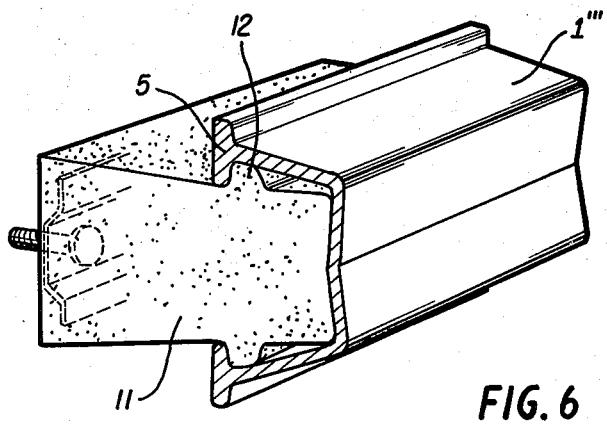

In addition to, or instead of, the closure plate 2, the section 1''' may include energy absorbers 11 of an expanded synthetic material which is preferably semirigid, such as polyurethane, FIG. 6 shows that one possibility for interlocking the section 1''' and the absorbers 11 can be realized by the cooperation of the flanges 5 of the section with pads 12 provided for this purpose on the surface of the absorbers. The pads may be made from various elastomers, such as natural rubber, the polyurethanes, or of thermoplastic materials of the polyamidepolypropylene type, etc.

Furthermore, it can be seen in FIG. 1 that the raised edges 4 of the section 1 are likewise usable for the mounting of the lateral support counterplates 13, the ends 14 of which are introduced between said raised edges 4.

Figure 2:
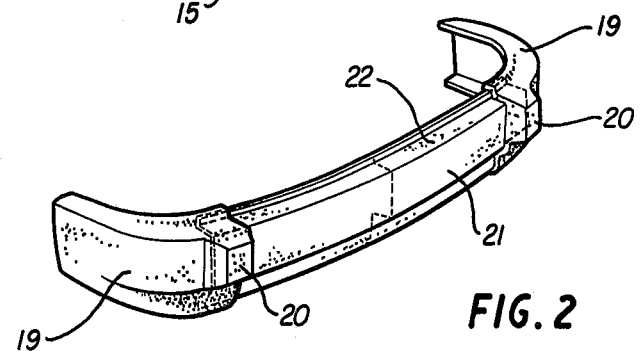
FIG. 2 is a perspective view of a first variant of an assembled absorber.

In the same fashion, lateral cheeks 15 may be added. The cheeks 15 may be partially introduced both into the section opening 16 of the section 1 and between its raised edges 4, through areas 17 and 18 respectively. Alternatively, the cheeks may be molded onto the section 1 as is shown in FIG. 2 at 19. In this case, the above molding operation may be used to mold stops 20 at the same time.

The structural variants of the section 1 illustrated in FIGS. 7 to 10 are intended to alleviate certain difficulties inherent in the pultrusion process.

At the time of the traction or drawing of the section 1 which causes the composite material to pass through the curved shaping draw plate, there may be a shift in the location of the continuous reinforcement wires, which under these conditions may finally end up outside of their intended reinforcement areas. This undesirable phenomenon is remedied by using rippled draw-plate surfaces, with the reinforcement wires being guided in the depressions thereof. It is consequently much more difficult for the wires to leave the areas assigned to them, thereby assuring the desired mechanical resistance characteristics of the final product.

The sections thus obtained are illustrated in FIGS. 7 to 10. In FIG. 7, it can be seen that the ripples are only on the inside and outside faces of the frontal part 21 of the section, while in FIG. 8 only the inside face has ripples, the section having been shaped between a ripple-bearing stamp and a smooth matrix. Naturally, this arrangement could be reversed without going beyond the scope of the invention.

In FIG. 9, it will be noted that not only the frontal face 21 but also the upper and lower borders 22 are ripple-bearing.

In the case of FIG. 10, the curved draw plate has varying contours such that over a fraction of its length (less than ⅔ of the total) it produces a conformation rippled product of the type illustrated in FIGS. 7 to 9, while on the remainder of its length the draw plate is once again smooth. The resulting product therefore has the advantages of having the reinforcement wires localized or in suitable places and also of presenting a conventional smooth surface aspect.

FIGS. 11 to 16 illustrate solutions provided for the problem of sections which must have variable-curve radii. The pultrusion process gives rise to products in which the curve radius is constant. But it is generally desirable to give the final bumpers a shape adapted to the corresponding body, and in particular to ensure that the ends are wrap-around.

Figure 11:
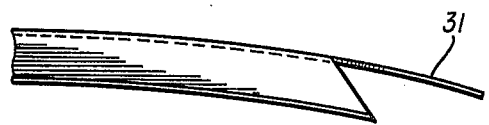
FIGS. 11 to 16 are views from above of three variants relating to the curve of the ends of the section, respectively before and after final forming.
Figure 12:
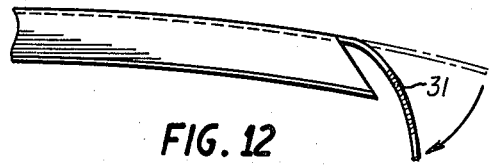

A first possibility is shown in FIG. 11, according to which the curved section obtained by pultrusion is machined to remove material such that its ends include only the front facade 31, which is easy to curve (FIG. 12).

Figure 13:
Figure 14:
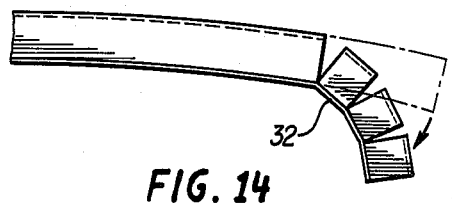

A variant is illustrated in FIG. 13, according to which it is the flanges on the rear face 32 at the ends of the section which remain intact, while the frontal part of the section as well as the upper and lower lateral borders undergo a series of notchings 34 allowing curvature according to a different radii (FIG. 14).

Figure 15:
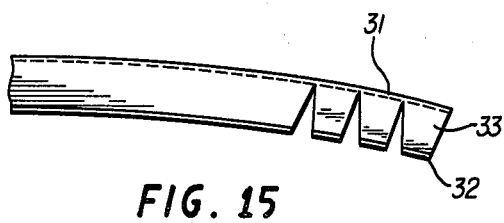
Figure 16:
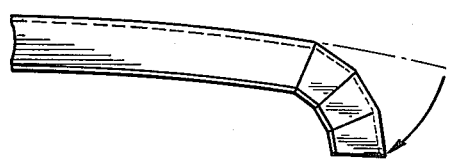

FIG. 15 is a symmetrical variant of the preceding according to which the notches are made from the rear through the flanges 32 and the lateral borders 33, leaving intact only the facade 31. After curving, the borders may be re-formed into continuous surfaces, for example by gluing (FIG. 16).

Sections of the above type are generally used as inserts, placed in a mold and molded with thermoplastic or thermohardening products such as PVC, the polyamides, the polyurethanes or the polyesters. This operation then blocks up the ends machined according to the methods described above, with the section serving as a reinforcement of the whole bumper.

Modifications of the curve radius of the ends of the section may further be achieved by thermally acting on the thermoplastic or thermohardening materials.

Figure 17:
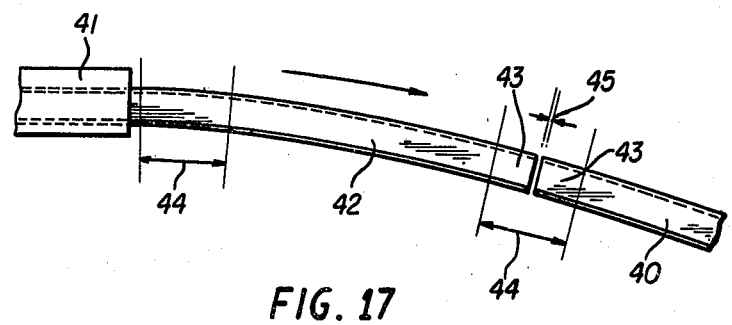
FIG. 17 is a view from above of the product leaving the drawing plate and the various areas that constitute the product.

This is shown diagrammatically in FIG. 17, which shows a section 40 continuously leaving the shaping draw plate 41.

According to this method, reticulation or setting of the section is performed only on the central part 42, to the exclusion of its ends 43 which are only gelled. This is achieved by momentary and localized interruption of the high-frequency heat, which is hence done discontinuously. Subsequently, the areas 44 of the section, having left the shaping draw plate while remaining in a gelled, unreticulated condition, reach a cutting station 45 which cuts them into equal parts 43.

Figure 18:
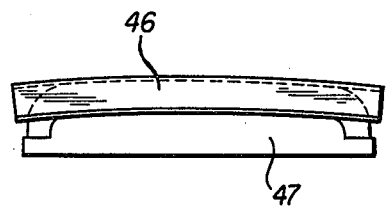
FIGS. 18 to 20 are views from above of a fourth variant in the conformation of the ends, respectively before, during and after forming.
Figure 19:
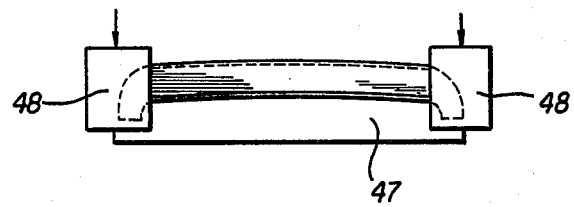
Figure 20:
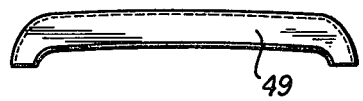

The elements 46 obtained are then taken up in a pressing tool (FIGS. 18-19) consisting of an appropriately shaped stamp 47 and two complementary matrices 48, acting on the unreticulated ends 43, shaping the ends 43 and finally heating them to produce the definitive section 49 in FIG. 20, having varying curve radii.

As in the case of the sections described previously, these latter ones may serve as inserts to produce molded bumpers; this operation may also be used to form various integrated elements such as lateral cheeks, stops, etc. Finally, it would not exceed the scope of the present invention to utilize the preceding techniques for modification of the initial curve radius by machining or thermally acting on areas of the section other than its ends.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of forming a composite vehicle bumper comprising:

forming an elongated section which is curved along the elongate axis thereof, said section defining a frontal face as well as upper and lower borders extending perpendicular to said frontal face, providing said upper and lower borders with a first edge formed unitary with an edge of said frontal face which is transverse to said axis and a free edge which is opposite said first edge and which includes a raised portion, wherein said section is formed by pultrusion molding of glass strands impregnated with hardening synthetic resin, including the drawing of said impregnated strands through a draw plate having a constant curve radius; and providing at least one closure plate having edges shaped to matingly engage said free edge by connecting each said closure plate between said free edges at an axial portion of said section which is subject to maximum stress during use.

2. The method of claim 1 including the step of forming the axial ends of said raised edges for attaching associated elements to said section.

3. The method of claims 1 or 2 including the step of providing at least one of the surfaces of said frontal face with ripples formed by a ripple face of said draw plate, whereby the stability of the location of wires in said section is assured.

4. The method of claims 1 or 2 including the steps of providing at least one of the surfaces of said frontal face with ripples formed by a ripple face of said draw plate during an intermediate stage in the manufacturing of said frontal face, and subsequently passing said section through a smooth face of said draw plate to provide a frontal face having smooth surfaces.

5. The method of claims 1 or 2 including the step of modifying the radius of curvature of said curved section such that it is not constant along the axial length of said section.

6. The method of claim 5 including the step of thermally modifying the radius of curvature of at least a portion of said section by local heating of the core of said portion when said section is in a thermoplastic state.

7. The method of claim 5 including the step of mechanically modifying the radius of curvature of at least a portion of said section when said portion of said section is partially cured.

8. The method of claim 5 including the step of modifying the radius of curvature of at least a portion of said section by removing portions of said section extending transverse to said axis to locally weaken said section, and mechanically modifying said radius of curvature.

9. The method of claim 1 including the step of molding additional material into said bumper.

* * * * *